United States Patent
Schnell

(10) Patent No.: US 7,308,196 B2
(45) Date of Patent: *Dec. 11, 2007

(54) MOTION DETECTOR CAMERA

(75) Inventor: Tim Schnell, Bedford, TX (US)

(73) Assignee: IP Holdings, Inc., Grand Prairie, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/609,209

(22) Filed: Dec. 11, 2006

(65) Prior Publication Data

US 2007/0081810 A1    Apr. 12, 2007

Related U.S. Application Data

(63) Continuation of application No. 10/876,899, filed on Jun. 25, 2004, now Pat. No. 7,149,422, which is a continuation of application No. 10/217,327, filed on Aug. 12, 2002, now Pat. No. 6,768,868, which is a continuation-in-part of application No. 09/757,803, filed on Jan. 10, 2001, now Pat. No. 6,735,387.

(51) Int. Cl.
G03B 17/00 (2006.01)

(52) U.S. Cl. .................. 396/153; 396/263; 396/427

(58) Field of Classification Search ................ 396/153, 396/263, 427; 348/152, 155
See application file for complete search history.

(56) References Cited

U.S. PATENT DOCUMENTS

| | | |
|---|---|---|
| 3,434,405 A | 3/1969 | Friedman |
| 3,563,148 A | 2/1971 | Newman |
| 3,759,152 A | 9/1973 | Fletcher et al. |
| 4,273,430 A | 6/1981 | Fritsche et al. |
| 4,341,452 A | 7/1982 | Korling |
| 4,445,767 A | 5/1984 | Kawazoe |
| 4,540,977 A | 9/1985 | Taillens et al. |
| 4,697,898 A | 10/1987 | Wakabayashi et al. |
| 4,901,096 A | 2/1990 | Lemelson |
| 4,937,604 A | 6/1990 | Yoshida et al. |
| 4,953,029 A | 8/1990 | Morimoto et al. |
| 5,097,285 A | 3/1992 | Wakabayashi et al. |
| 5,128,548 A | 7/1992 | Goodson et al. |
| 5,150,150 A | 9/1992 | Enomoto |
| 5,155,474 A | 10/1992 | Park et al. |
| 5,237,365 A | 8/1993 | Miyazawa |

(Continued)

OTHER PUBLICATIONS

"RedHead Hunting Specialists Catalog", Fall 1999,234.

(Continued)

Primary Examiner—W. B. Perkey
(74) Attorney, Agent, or Firm—Schwegman, Lundberg & Woessner, P.A.

(57) ABSTRACT

A motion detector camera includes a camera mechanism mounted inside a housing, a motion detector exposed on a surface of the housing, and a controller for controlling the camera mechanism in response to signals received from the motion detector. The camera can include an activity counter mounted to the housing. The controller activates the camera mechanism when the controller receives a triggering signal from the motion detector, or the controller activates the activity counter and does not activate the camera mechanism when a triggering activity occurs. The camera can include digital camera electronics. A camera support can be used to removably mount the camera to an object such as a tree.

13 Claims, 12 Drawing Sheets

U.S. PATENT DOCUMENTS

| | | |
|---|---|---|
| 5,309,145 A | 5/1994 | Branch et al. |
| 5,400,185 A | 3/1995 | Scerbo, III |
| 5,517,201 A | 5/1996 | Thompson, Jr. |
| 5,610,580 A | 3/1997 | Lai |
| 5,666,582 A | 9/1997 | Nakai et al. |
| 5,819,124 A | 10/1998 | Somner et al. |
| 5,867,099 A | 2/1999 | Keeter |
| 5,878,283 A | 3/1999 | House et al. |
| 6,154,133 A | 11/2000 | Ross et al. |
| 6,195,310 B1 | 2/2001 | Morgan, II |
| D439,591 S | 3/2001 | Reidt et al. |
| 6,289,179 B1 | 9/2001 | You |
| 6,735,387 B1 | 5/2004 | Schnell |
| 6,768,868 B1 | 7/2004 | Schnell |
| 6,834,162 B1 | 12/2004 | Schnell |
| 7,149,422 B2 | 12/2006 | Schnell |
| 2002/0159770 A1 | 10/2002 | Moultrie, Jr. |
| 2005/0041964 A1 | 2/2005 | Schnell |
| 2005/0151851 A1 | 7/2005 | Schnell |

OTHER PUBLICATIONS

"RedHead Hunting Specialists Catalog", Fall 2000, 236-237.

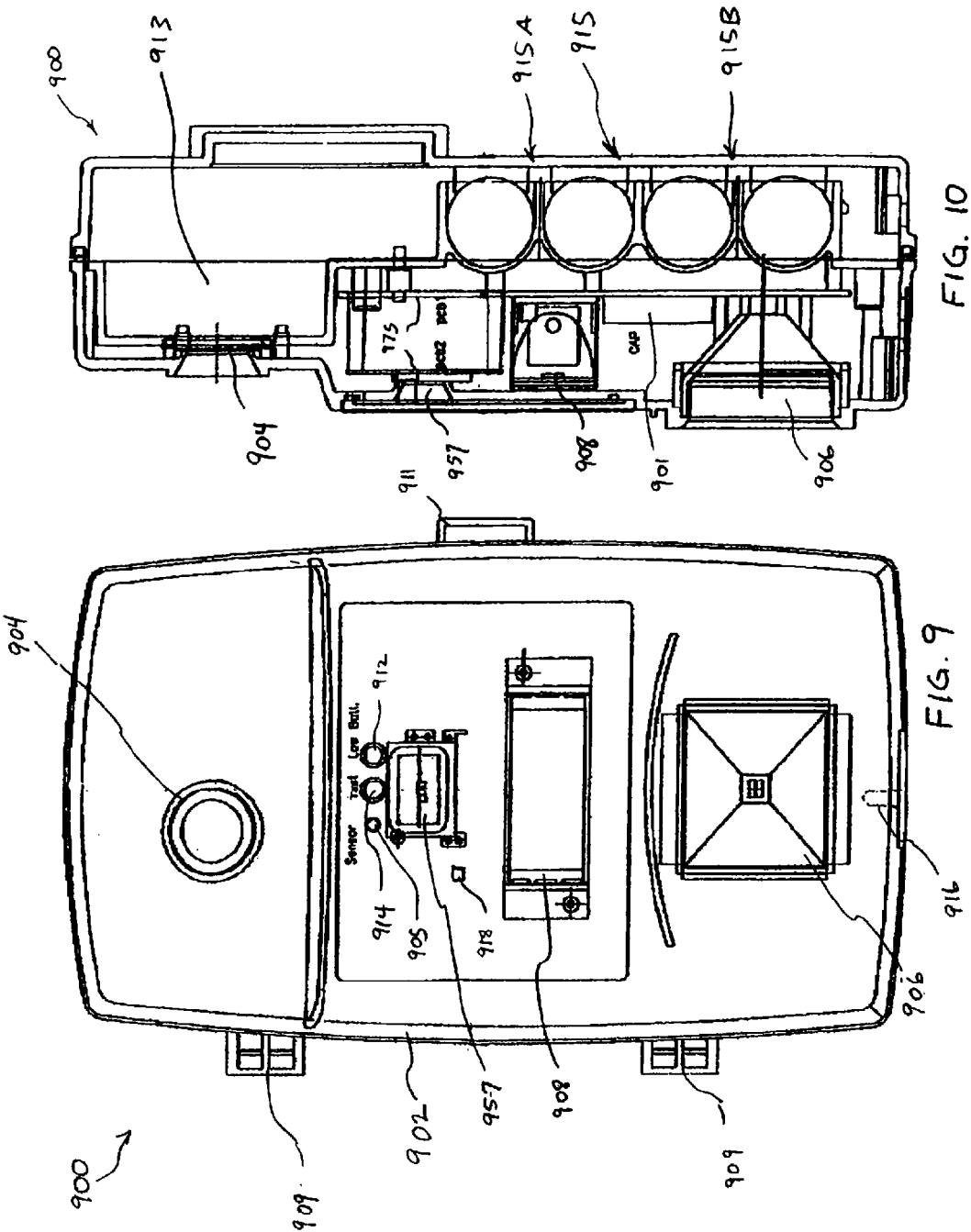

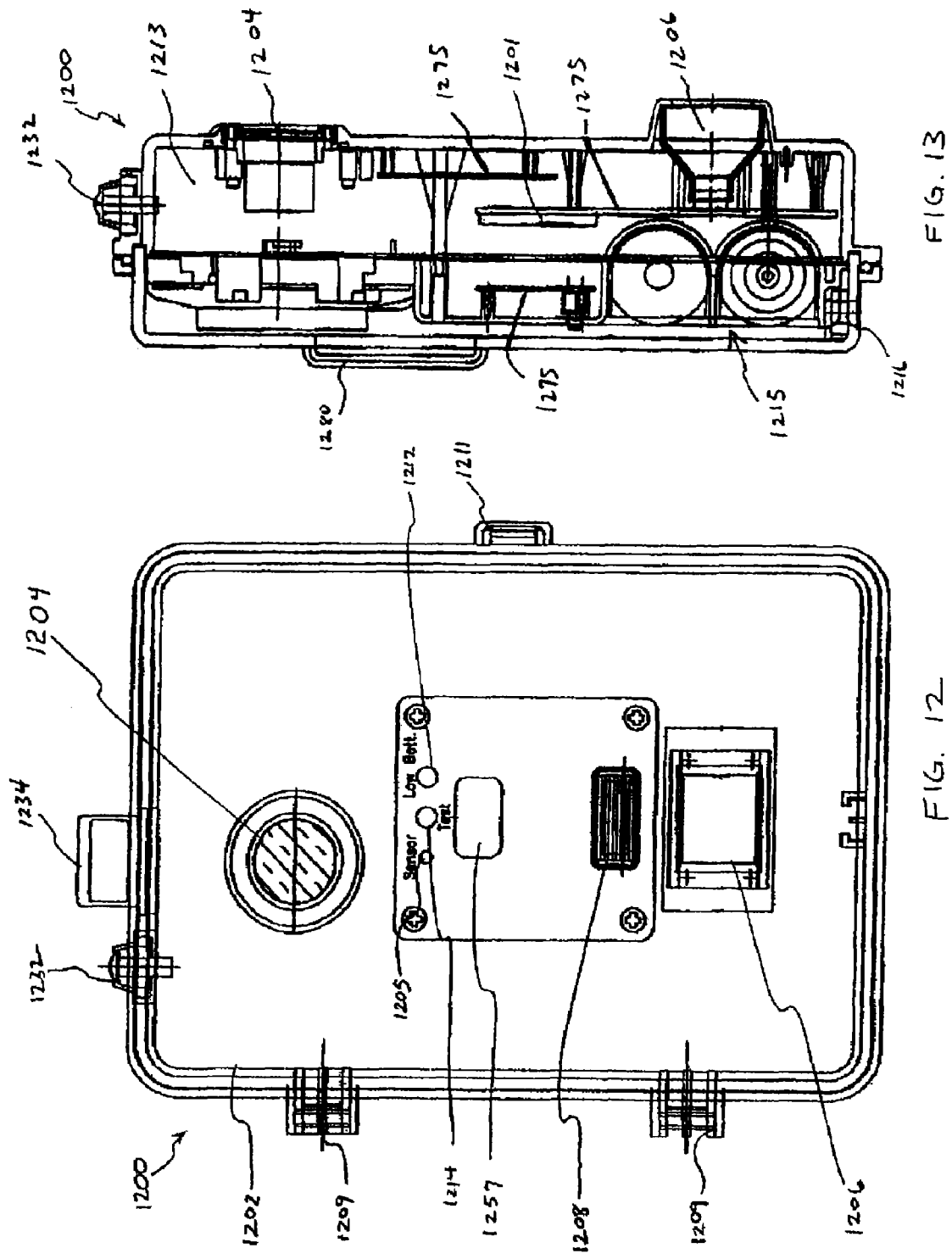

MOTION DETECTOR CAMERA

RELATED APPLICATIONS

This application is a continuation of U.S. patent application Ser. No. 10/876,899, filed Jun. 25, 2004, now U.S. Pat. No. 7,149,422 which is a continuation of U.S. patent application Ser. No. 10/217,327, filed Aug. 12, 2002, now issued as U.S. Pat. No. 6,768,868, which is a continuation-in-part of U.S. patent application Ser. No. 09/757,803, filed Jan. 10, 2001, now issued as U.S. Pat. No. 6,735,387, all of which are incorporated herein by reference.

FIELD OF THE INVENTION

This invention relates to the field of cameras, and more specifically to motion triggered cameras.

BACKGROUND

Cameras generally include a light-proof enclosure having an aperture with a shuttered lens through which the image of an object is focused and recorded on a photosensitive film. A user typically triggers the shutter to expose the film, thus allowing a picture to be made.

Sometimes it is desirable for a user to take a picture when they are not present. For instance, the user may want to keep surveillance on an area for security or surveillance reasons. In some situations, the camera is switched on and continuously scans the area. In other situations, the camera is triggered by an event. For instance, U.S. Pat. No. 5,878,283 to House discusses a single-use camera that incorporates a motion sensor to activate the shutter and take a photograph. Other motion detector cameras typically have a conventional, third-party 35 mm camera mounted within a housing and are thus constricted as to the options the camera can provide.

SUMMARY

One aspect of the present system includes a motion detector camera having a camera mechanism mounted inside a housing, a motion detector exposed on a surface of the housing, and a controller for controlling the camera mechanism in response to signals received from the motion detector. The motion detector camera includes a first power source connected to the camera mechanism and a separate, second power source connected to the motion detector.

Another aspect includes a motion detector camera having a camera mechanism mounted inside a housing, a motion detector exposed on a surface of the housing, and an activity counter mounted to the housing. The motion detector camera includes a controller having at least two operating modes. In the first operating mode the controller activates the camera mechanism when the controller receives a triggering signal from the motion detector, and in the second operating mode the controller activates the activity counter and does not activate the camera mechanism when a triggering activity occurs.

Another aspect includes a motion detector camera having a camera mechanism mounted inside a housing, a motion detector exposed on a surface of the housing, a controller for activating the camera mechanism when a triggering activity signal is received from the motion detector, and a shutter button located external to the housing to manually activate the camera mechanism.

Another aspect includes a motion detector camera having digital camera electronics mounted within a housing, a flash, a motion detector, and a controller. The controller sends a signal to the flash and to the digital camera electronics when the controller receives a triggering signal from the motion detector

BRIEF DESCRIPTION OF THE DRAWINGS

FIG. 9 shows a front view of a motion detector camera according to one embodiment.

FIG. 10 shows an exposed side view of the motion detector camera of FIG. 9.

FIG. 12 shows a front view of a motion detector camera according to one embodiment.

FIG. 13 shows an exposed side view of the motion detector camera of FIG. 12.

DETAILED DESCRIPTION

The following detailed description and accompanying drawings show specific embodiments in which the present invention may be practiced. These embodiments are described in sufficient detail to enable those skilled in the art to practice the invention. Other embodiments may be utilized and structural changes may be made without departing from the scope of the present invention.

Figure 1:
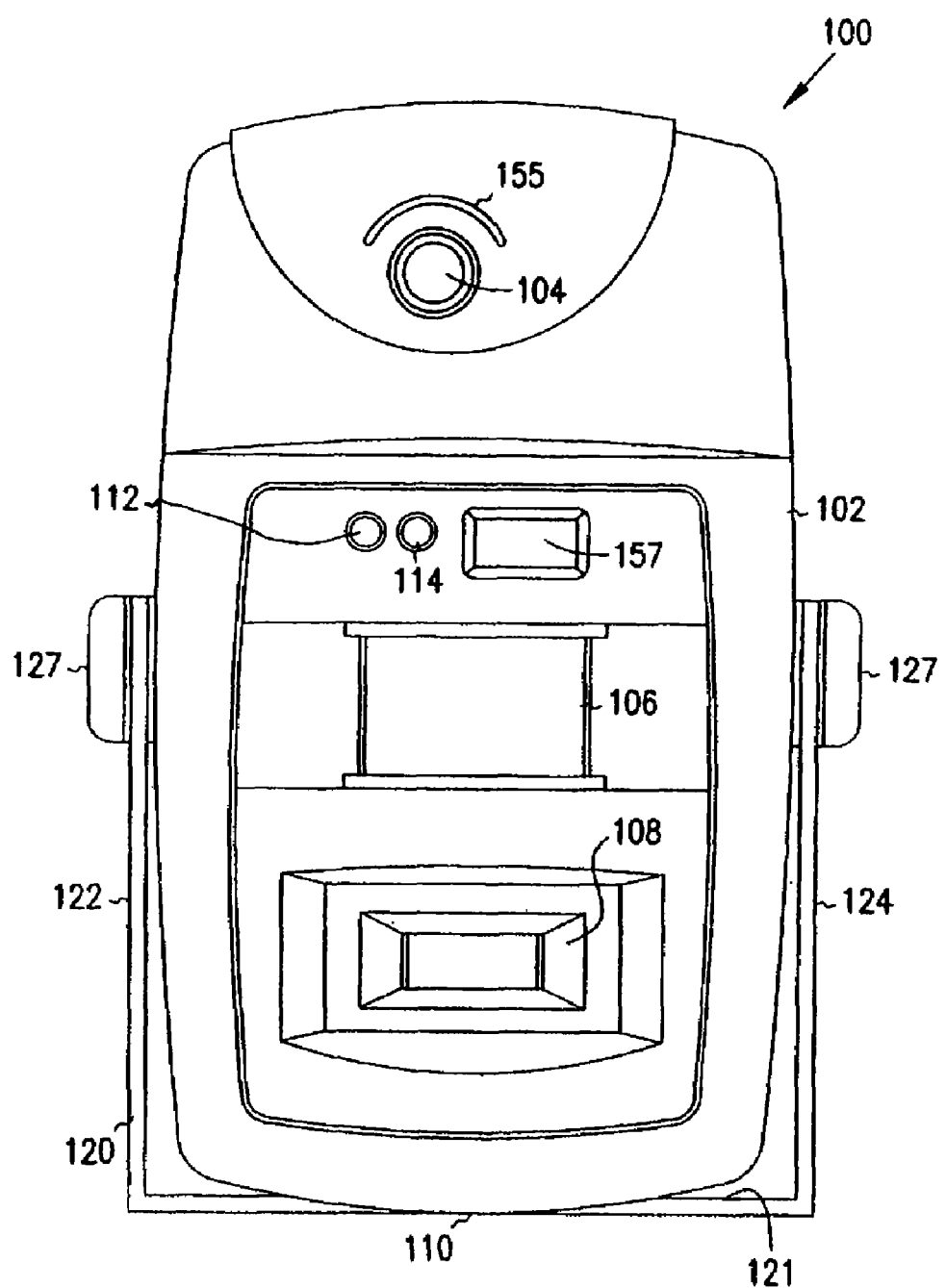
FIG. 1 shows a front view of a motion detector camera according to one embodiment.
Figure 2A:
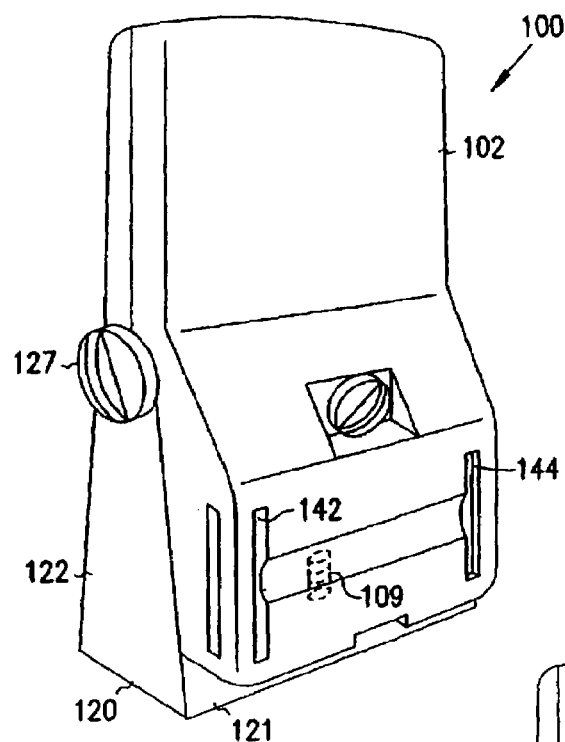
FIG. 2A shows a rear isometric view of the camera of FIG. 1.
Figure 2B:
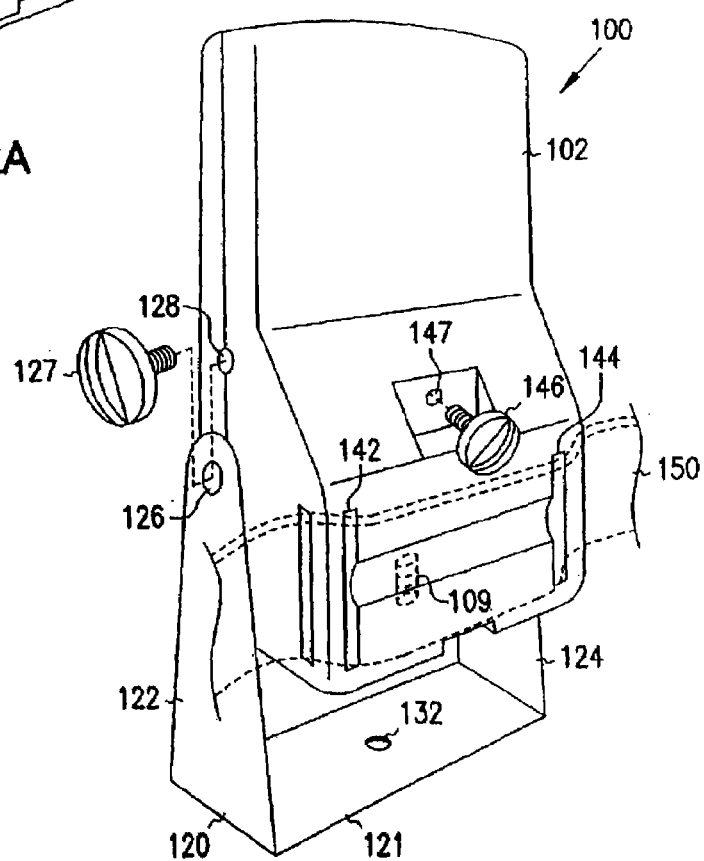
FIG. 2B shows another rear isometric view of the camera of FIG. 1.

FIGS. 1, 2A and 2B show a motion detector camera 100 according to one embodiment of the present invention. Camera 100 includes a housing 102, a lens 104, a motion detector such as infra-red sensor 106, and a flash 108.

Housing 102 is an enclosure for holding the various components of the camera. Housing 102 can be a plastic, metal or composite material. Housing 102 is sealed so as to be waterproof. In one embodiment, housing 102 is adapted to be weatherproof to withstand temperature swings from approximately −40 degrees F. to approximately 100 degrees F. Mounted within housing 102 is the film for the camera, such as a 35 mm film cartridge, an automatic film advance mechanism, and other conventional camera components. Also mounted within the housing is a power supply, such as 4 D-size batteries or other size batteries, or a solar power source. These internal components will be described below.

On a bottom surface 110 of housing 102 is a mounting section 109, such as a threaded hole, for mounting housing 102 to a standard camera tripod or other camera support member sized to matingly fit with mounting section 109. Mounting section 109 can be a separate nut mounted to the housing or an integrally formed threaded hole. In one embodiment, attached to a front surface of housing 102 are a first light 112 and a second light 114. First light 112 is an LED or other equivalent light. First light 112 is a power supply indicator which is activated when the power supply within the housing becomes low. Second light 114 is also an LED or other equivalent light. Second light 114 is used as a testing indicator. Further details of various uses of lights 112 and 114 will be described below.

In this embodiment, housing 102 is attachable to a support or stand 120. Stand 120 includes a base 121 which has a first arm 122 attached at one end and a second arm 124 attached at a second end. This structure provides an approximately U-shaped stand for mounting housing 102. Stand 120 includes a mounting hole 126 in each arm which is located so that a mounting bolt 127 extends through hole 126 to attach to a hole 128 in a side surface of housing 102 to mount the housing to the stand. In one example, mounting bolt 127 is a threaded bolt having a hand-turnable knob on one end and hole 128 is a threaded hole. This allows the housing 102 to be removably attached to stand 120, while giving a user the options of other attachment methods.

Base 121 of stand 120 includes a hole 132 which is located at the same position relative to mounting member 109 of housing 102. A tripod mounting post can extend through hole 132 to mount with mounting member 102. Thus, motion detector camera 100 can be mounted to a tripod either using stand 120 or without the stand.

Another method of mounting housing 120 to a structure is provided by mounting members 142 and 144 located on the rear portion of housing 102. In one example, mounting members 142 and 144 are slots located on each rear corner, respectively, of the housing. As shown in FIG. 2B, a member such as a flexible band 150 can be threaded through the slots and attached to a surface, such as a tree, post, or other mounting surface. These various mounting methods can be combined so as to provide a secure mounting of the camera. This allows the camera to be portable while still allowing a user to know it is secure.

Housing 102 includes a hole 147 in a rear surface of the housing for mounting a threaded bolt 146 for holding portions of the housing together.

In this example, lens 104 is a fixed focus lens which can provide a focus up to approximately 50 feet away. Those skilled in the art will appreciate that other lens types may be substituted as necessary. In one example, an F5.6 lens is used. Alternatively, lenses can be used which provide fixed focus up to 15 feet, 25 feet, 30 feet, or other distances provided by fixed focus lenses known in the art. In some embodiments, an auto-focus lens and focusing mechanism can be used. Lens 104 is a wide-angle lens so that camera 100 is capable of taking pictures over a wide range. In one embodiment, a ridge 155 is located above the lens to help shield and protect the lens.

Motion detector 106 can include an infrared sensor. In one example, motion detector 106 is a sensor which detects heat and motion up to 50 feet away from the housing. Other embodiments provide sensing up to 30 feet away. In this example, the infrared sensor has a 110 degree angle coverage. Alternatively, motion detector 106 can be a light sensor, an RF sensor or other equivalent motion or heat sensor.

In one embodiment, flash 108 provides a flash up to 23 feet away. Other size flashes for providing larger flash distances can be incorporated into the housing. For instance, one embodiment provides a 50 foot flash. In the present embodiment, although contained within the same overall housing 102, flash 108 is separate from lens 104, the film advance mechanism, and the other internal components of the camera. In other words, flash 108 and the other camera components are not an integral unit such as in a conventional 35 mm flash camera. As noted above, some motion detector cameras have a conventional, third-party 35 mm camera with a built-in flash mounted within a housing and are thus constricted as to the options the camera can provide. Here, the separate, yet all-in-one, structure of motion detector camera 100 allows flash 108 to be larger than in conventional 35 mm cameras while still providing the portable structure provided by including all the necessary picture taking components within a single housing 102.

In one embodiment, camera 100 includes a LCD display 157 for displaying the number of exposures taken by the camera. Display 157 can also be used to display other information, such as power level and so forth.

Figure 3:
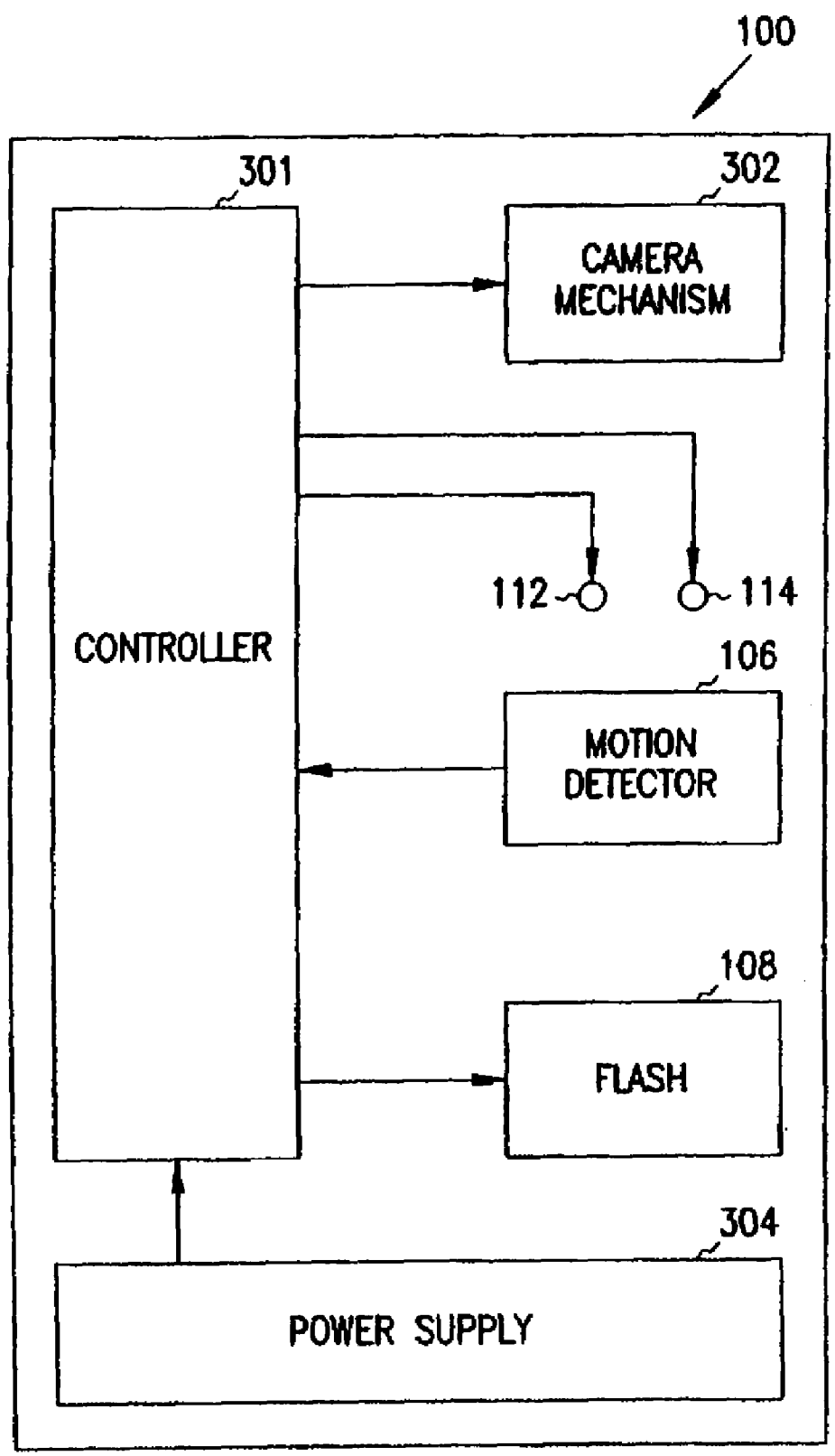
FIG. 3 show a schematic representation of the internal components of a motion detector camera according to one embodiment of the present invention.

FIG. 3 shows a schematic representation of the internal components of motion detector camera 100. Included within the camera housing are the motion detector 106 and flash 108 described above. Shown here schematically are a controller 301, the camera mechanism 302 which includes a camera shutter, an automatic film advance mechanism, and other conventional camera features, and a power supply 304.

Controller 301 is a control unit which includes circuitry and/or software for controlling the functions of motion detector camera 100. Controller 301 is coupled to first light 112, second light 114, motion detector 106, flash 108, camera mechanism 302, and power supply 304.

Controller 301 is programmable to provide a variety of functions for camera 100. In one example, motion detector 106 sends a signal to controller 301 when a triggering event occurs. One example of a triggering event is a motion detected by motion detector 106. When controller 301 receives the signal indicating a triggering event, the controller then sends signals to flash 108 and camera mechanism 302 to actuate the shutter and take a picture, and to advance the film. In one embodiment, a light sensor can be incorporated into camera 100 to measure the light available and the controller can omit sending a signal to flash 108 if it is not necessary for the picture being taken.

In another example, controller 301 is programmed to cause the camera to take a pre-determined number of exposures per triggering event. This places the controller into a burst state. For instance, a user may want to have a burst of pictures taken when motion is detected. In this case, when controller 301 receives a signal from motion detector 106, the controller causes a series of exposures to be taken one after another in rapid succession. In one embodiment, the controller can be programmed by a user to provide anywhere between 1 and 9 exposures per triggering event.

In another example, controller 301 is programmed so that controller can be put into a pause state. When put into a pause state, the controller ignores any triggering events of motion detector 106 until a pre-determined amount of time has elapsed. This allows a user to avoid wasting film when the motion detector is triggered by the same source very quickly. In one embodiment, the controller is programmable by a user so that the time of the pause between possible exposures is set optionally between 1 to 60 minutes.

In another example, controller 301 senses the power remaining in power supply 304 and when the power reaches a pre-determined low level, the controller activates first light 112 which acts as a low power indicator. This allows a user to predict if a camera 100 which is going to be unattended for a period of time will have enough power to function during the time period.

In another example, controller 301 activates second light 114 to perform testing functions. For instance, when controller 301 is put into a testing state, the controller causes test light 114 to blink when the motion detector is triggered, but the controller does not cause the camera to expose any film. This allows a user to test the camera without wasting any film. Another example causes test light 114 to blink when the camera is turned on, allowing a user to know the system is working.

In another example, controller 301 sends a signal to camera mechanism 302 so that, at a user's option, a hour/minute stamp is placed on a picture, a year/date/month stamp is placed on the picture, or a time and date stamp is placed on the picture. This option allows a user the flexibility of choosing how to analyze the pictures taken.

Figure 4A:
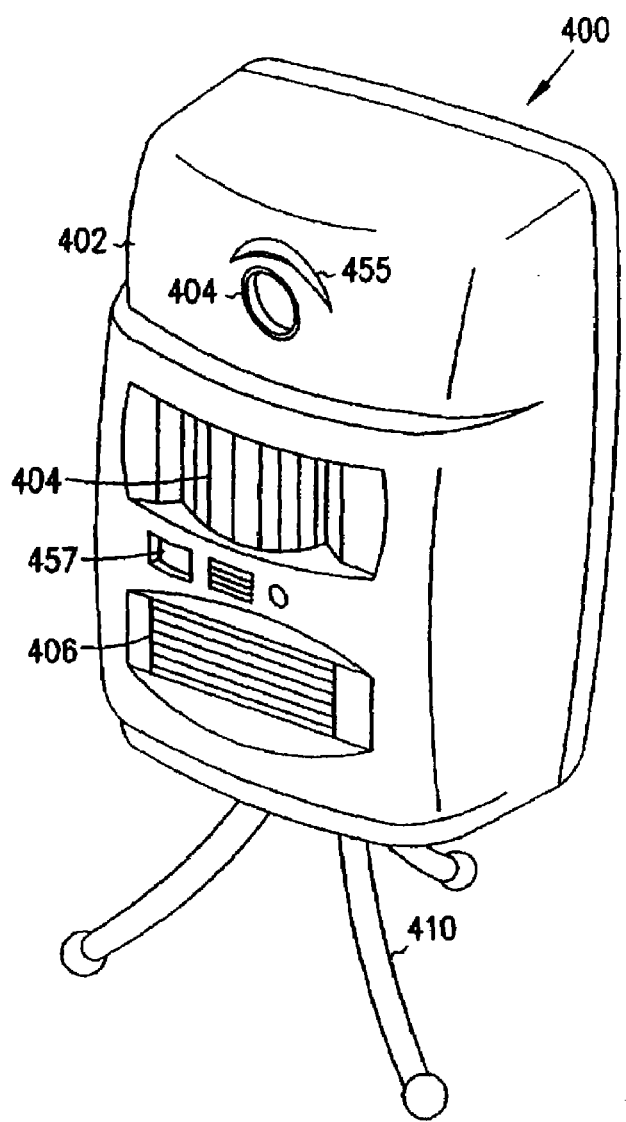
FIG. 4A shows a front isometric view of a motion detector camera according to one embodiment.

FIG. 4A shows a camera 400 according to another embodiment of the present invention. Camera 400 includes substantially the same components as camera 100 described above and certain details will be omitted. Camera 400 includes a housing 402, lens 404, motion detector 404, flash 406, film counter display 457, and a controller (not shown).

Figure 4B:
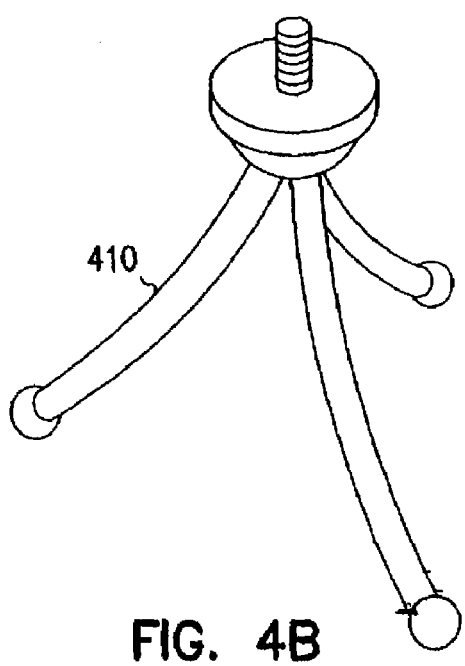
FIG. 4B shows details of a tripod of FIG. 4A.

FIG. 4B shows an example of a tripod 410 for mounting camera 400 on as is shown in FIG. 4A. Camera 400 includes a mounting member in a bottom surface to attach the camera to tripod 410.

Figure 5C:
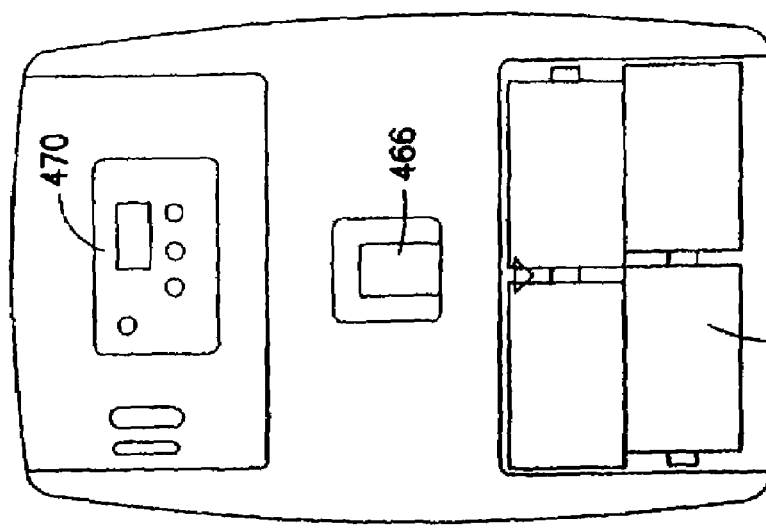
FIG. 5C shows a rear view of the camera of FIG. 4A.
Figure 5B:
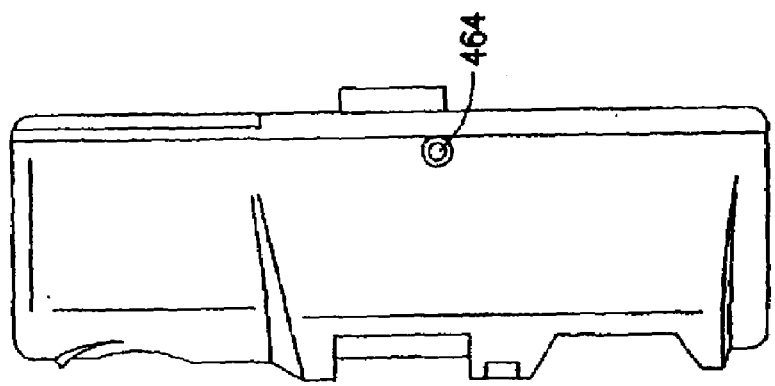
FIG. 5B shows a side view of the camera of FIG. 4A.
Figure 5A:
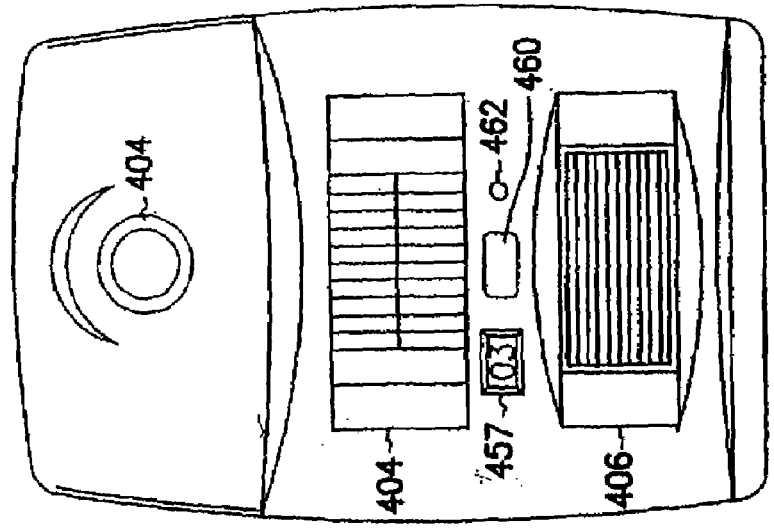
FIG. 5A shows a front view of the camera of FIG. 4A.

FIGS. 5A-5C show a front, side and rear view of motion detector camera 400. Camera 400 includes an IR receiver 460 and a light 462 such as an LED. In this embodiment, camera 100 includes DC jack 464 for optionally providing external power to the camera. As shown in FIG. 5C, batteries 468 can also be used as a power supply. In one option, a solar collector is provided on a surface of the camera, and the camera is partially or completely powered by a solar power cell as the power supply. Camera 400 includes a mounting base 466 and camera controls 470 on a rear side of the camera. Camera controls 470 can include features to program the controller of camera 400 to perform the functions described above for camera 100.

Figure 6B:
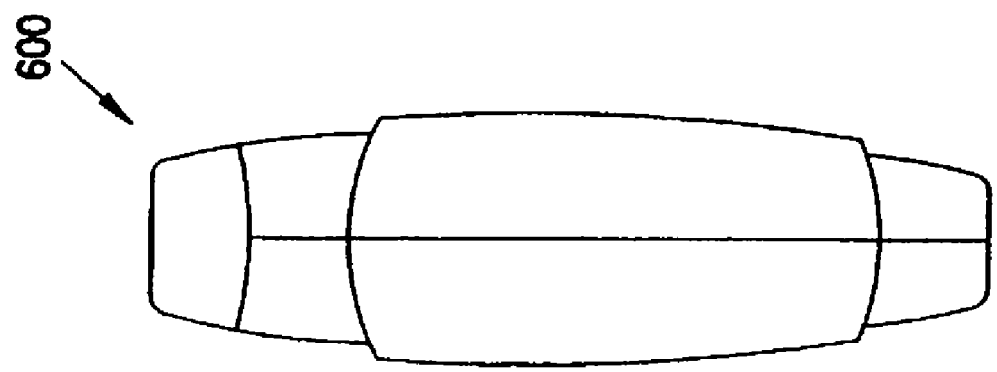
FIG. 6B shows a side view of the remote control of FIG. 6A.
Figure 6A:
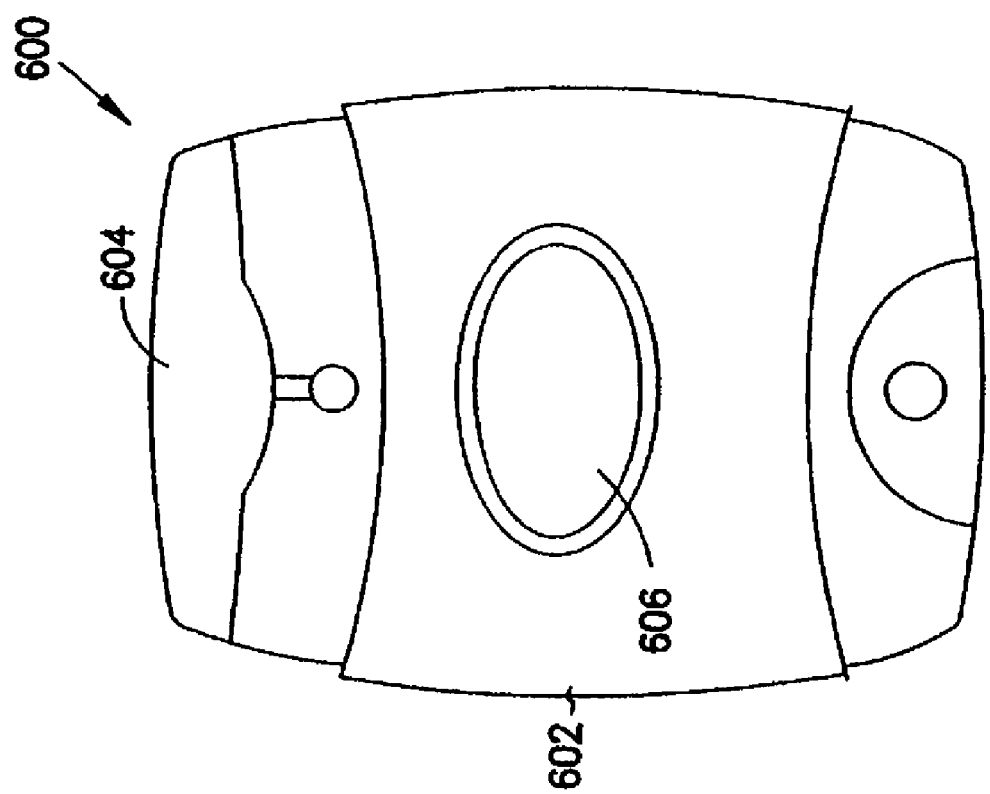
FIG. 6A shows a top view of a remote control for a motion detector camera according to one embodiment.

FIGS. 6A and 6B show a remote control 600 for use with a motion detector camera according to one embodiment of the present invention. Remote control 600 includes a handheld body 602 which includes an IR transmitter 604 and an actuating switch 606. In one embodiment, remote control 600 communicates with a camera, such as camera 400, by sending a signal via IR transmitter 604 to IR receiver 460 (See FIG. 5A). A user can utilize remote control 600 to turn on the camera, test the camera, or to change various functions of the camera.

Figure 7:
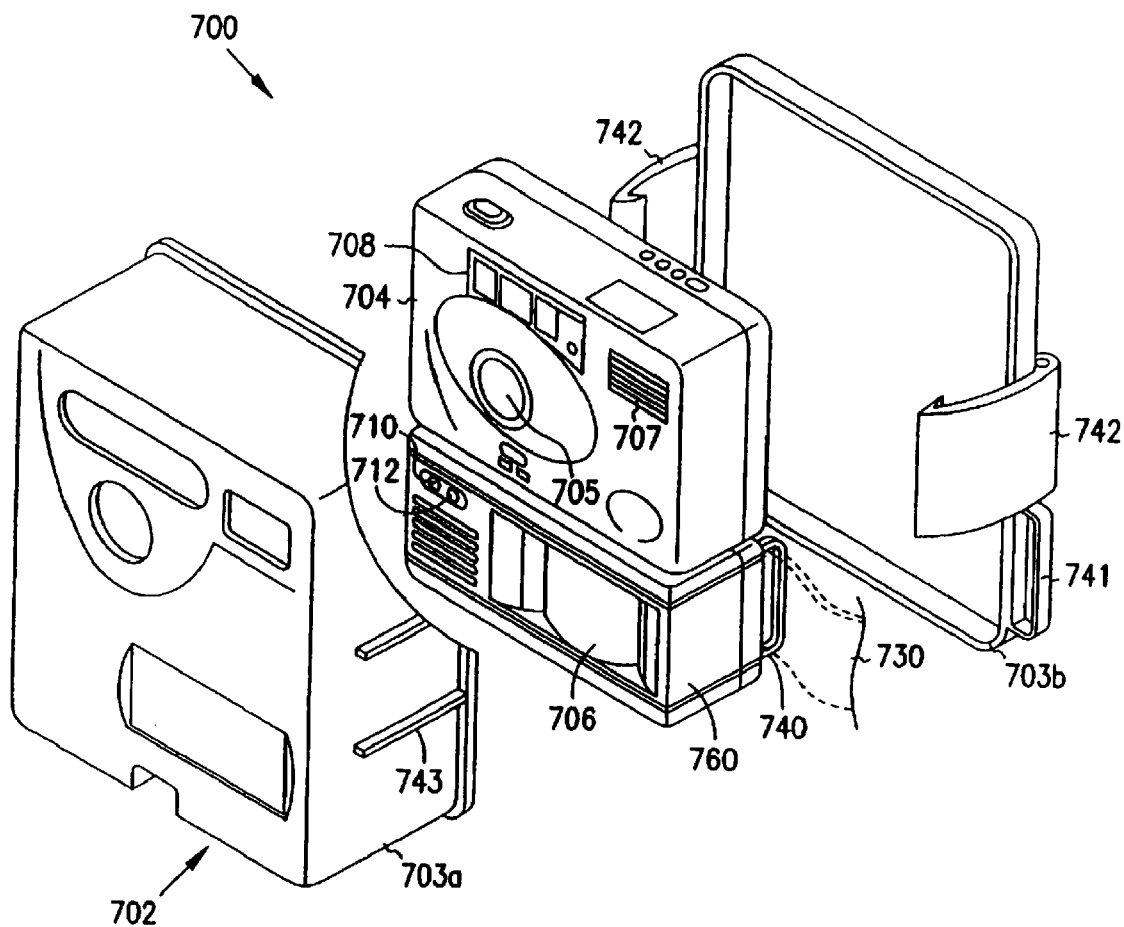
FIG. 7 shows an exploded isometric view of a motion detector camera according to one embodiment.

FIG. 7 shows an exploded view of a motion detector camera 700 according to another embodiment of the present invention. Camera 700 includes a housing 702, a camera section 704, and a motion detector 706.

Housing 702 includes a two-part structure including a front member 703a which is removably mountable with a rear member 703b. In this embodiment, members 703a and 703b are clear plastic members. Alternatively they can be other types of plastic, or metal members. A pair of latches 742 are located on rear member 703b. Front member 703a includes a matching set of mounting members 743 which couple with latches 742. In this embodiment, when latched together, housing 702 is a waterproof housing. Housing 702 also includes attachment members such as slots 741 for threading a flexible band 730 through for attaching the camera to a mounting surface. Camera 700 includes mounting members such as slots 740 for mounting flexible band 730 directly to an enclosure 760.

Camera section 704 includes a lens 705 and a flash 707. In this embodiment, one or more conventional camera features such as automatic focus sensors and automatic flash sensors 708 are included. Alternatively, a fixed focus lens can be utilized.

Motion detector 706 is mounted within enclosure 760 which also includes one or more lights 710 and 712, which are substantially equivalent to lights 112 and 114 described above for camera 100.

A controller is mounted within enclosure 760 and coupled to the various components of camera 700 as shown above in FIG. 3 for camera 100.

Camera 700 is relatively compact. In one embodiment, the camera has overall dimensions of approximately (147 mm×140 mm×67 mm). This compact size allows for easy portability and allows the camera to be easily hidden. In one example, a hole can be incorporated into the top surface of housing 702 to allow a user to manually access the shutter button of camera 704.

Figure 8:
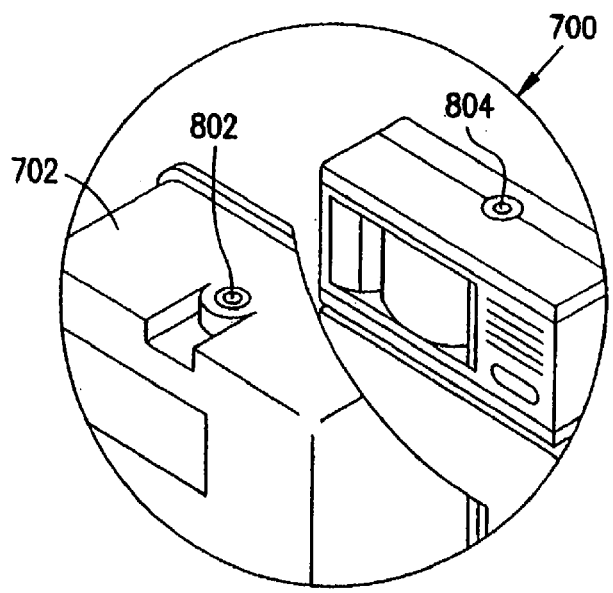
FIG. 8 shows a partial bottom view of the camera of FIG. 7.

FIG. 8 show a partial view of the bottom of camera 700. In this embodiment, camera 700 includes a tripod-type mounting member, such as a threaded hole 804 in a bottom surface of the camera, or a separate threaded nut can be mounted to the bottom surface of the camera. A hole 802 is located in a bottom surface of housing 702 for a tripod-type mounting post to extend through.

Figure 11:
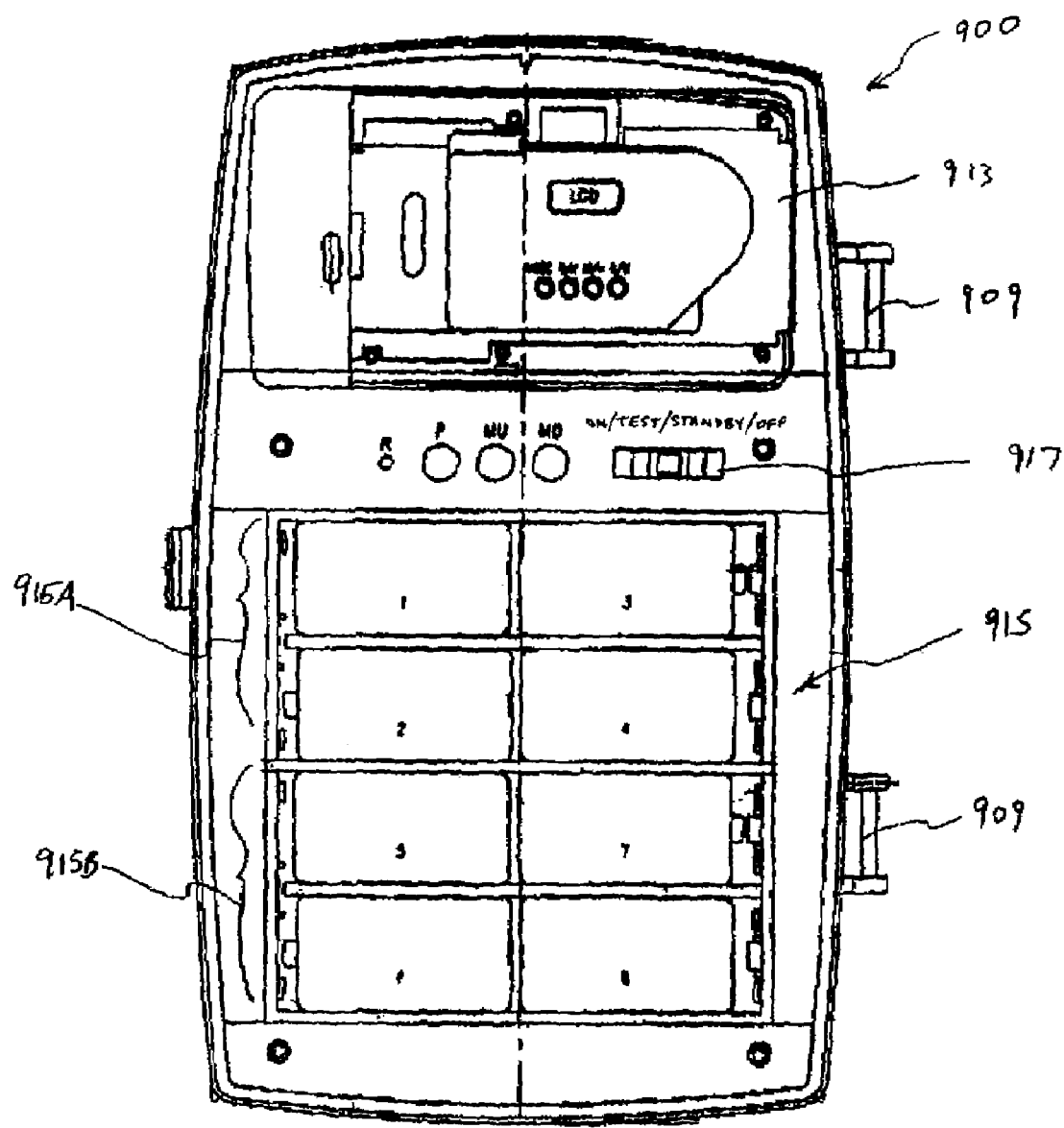
FIG. 11 shows a back view of the motion detector camera of FIG. 9.

FIGS. 9-11 show a front view, side view, and back view, respectively, of a motion detector camera 900 according to one embodiment. Camera 900 includes some features similar to the motion cameras discussed above and certain details will be omitted for sake of clarity. In general, camera 900 includes a housing 902, a lens 904, a flash, 908, and a motion detector 906, such as an infra-red sensor to activate the camera by detecting heat and motion.

In this example, housing 902 is a two-part enclosure for holding the various components of the camera. Front and back shells of housing 902 are coupled together by a pair of hinges 909. A latch 911 is provided for opening and closing the shells. Housing 902 can be a weather-proof or weather-resistant housing. Mounted within housing 902 is a camera mechanism 913. In one embodiment, within camera mechanism 913 is the film for the camera, such as a 35 mm film cartridge, an automatic film advance mechanism, and other conventional film camera components.

In one example, camera mechanism 913 can include digital camera components including a light sensitive chip and one or more outputs (such as video out outputs or a USB port) for outputting the digital images to a TV, a computer, or a storage device. A digital camera can also include a removable or permanent flash-memory card to hold images. In one example, an 8 Mbyte flash memory is provided to hold up to 116 images. In one example, a viewfinder screen can be provided. The controller can be programmed to time and date stamp the digital images. Also, the controller can be programmed to store the time and date of a triggering activity in a memory, with or without taking a picture. This activity information can then be downloaded, saved, and analyzed. In one example, a digital resolution of 640×480 is provided.

Also mounted within the housing is a power supply 915, such as 8 C-size batteries. Depending on use, other batteries (2 or 4 C-size batteries, AA batteries, D batteries, etc.) or a solar power supply can be used as power source 915. In one embodiment, power supply 915 is separated into a dual power supply. In a dual power supply, a first portion of power supply 915, such as one or more batteries 915A, are used to power flash 908 and camera mechanism 913 while a second portion of power supply 915, such as one or more batteries 915B, are used to power motion detector 906. By separately powering the motion sensor and the camera/flash components, the present system helps avoids either the flash or the motion sensor from draining off too much power. Among other advantages, this allows the flash to be quickly recharged and the system to last longer without needing new batteries.

On a bottom surface of housing 902 is a mounting section 916, such as a threaded hole, for mounting housing 902 to a standard camera tripod or other standard-sized camera mounting member. The mounting section can also be a separate nut attached to the camera housing. Other mounting and securing means discussed above can be incorporated into camera 900. Exposed on a front surface of housing 902 are a low battery light 912 and a test light 914 which are similar to lights 112 and 114 discussed above for camera 100.

In one embodiment, motion detector 906 is a passive infrared motion sensor to detect heat and motion. In one example, motion detector 906 is a sensor which detects motion up to 50 feet away from the housing. Other embodiments provide sensing up to 23 feet away. The motion sensor can have a vertical coverage range of approximately 60 degrees and a horizontal coverage range of approximately 45 degrees. Some embodiments include an adjustable detector 906 and a button, slider, or other actuating member 918 on the housing to allow a user to control the effective distance of motion detector 906. The controller can also be programmed to control the effective distance of the sensor. For example, the user can acuate member 918 and the controller can vary the effective distance of detector 906 from 15 feet to 30 feet. This allows a user to control the proper distance to be sensed while using the present system. In some embodiments, motion detector 906 can be a light sensor, an RF sensor, an active IR sensor, or other equivalent motion sensor.

In this example, flash 908 is effective up to approximately 23 feet when the camera is used with ISO 200 film. With ISO 400 film it is effective up to approximately 33 feet, and with ISO 800 film it is effective to approximately 46 feet. One example uses a flash having an effective distance of up to 90 feet. As discussed above for camera 100, although flash 908 is contained within the same housing 902 as the rest of the camera mechanism, flash 908 is separate from lens 904 and the other mechanism 913 of the camera. In other words, flash 908 and the other camera components are not an integral unit such as in a conventional 35 mm flash camera. Again, this separate, yet all-in-one, structure of motion detector camera 900 allows flash 908 to be larger than in conventional 35 mm or digital cameras while still providing the portable structure provided by including all the necessary picture taking components within a single housing 902.

FIG. 10 shows a display 957, motion detector 906, and flash 908 coupled to one or more printed circuit boards 975. One or more processors, memory chips, circuitry and/or software, etc. for controlling the functions of motion detector camera 900 can be mounted to PCBs 975 to constitute a controller 901 for camera 900. Here, the controller is shown schematically as controller 901. Controller 901 is operatively coupled to first light 912, second light 914, motion detector 906, flash 908, camera mechanism 913, and power supply 915.

Controller 901 is programmable to provide a variety of functions for camera 900. In one example, motion detector 906 sends a signal to controller 901 when a triggering event occurs. One example of a triggering event is a motion detected by motion detector 906. When controller 901 receives the signal indicating a triggering event, the controller send signals to flash 908 and camera mechanism 913 to actuate the shutter and take a picture, and to advance the film. In one embodiment, a light sensor 905 (FIG. 9) is incorporated into camera 900 to measure the light available and the controller can omit sending a signal to flash 908 if it is not necessary for the picture being taken.

In one embodiment, display 957, such as an LCD display, is for displaying information such as the number of exposures taken by the camera. Display 957 can also be used to display other information, such as power level and so forth. In one embodiment, display 957 can also be used as an activity counter displaying the number of triggering activities sensed by the motion sensor. For example, if display 957 is used as an activity counter, controller 901 can increase the activity counter by one when motion detector 906 is triggered and sends a triggering signal to the controller.

In one operating mode, the activity counter can increase and a picture can be taken when the signal is received. In another mode, the controller can be set so that only the activity counter increases, and a picture is not taken. In one example, the activity counter can increase while pictures are being taken and when the film runs out, the activity counter can increase while no pictures are taken.

In some examples, the activity counter can be controlled to have a pause state or sleep state between activations. For example, when one triggering signal is sent from the motion detector to the controller, the controller can increase the activity counter by one and then go into a pause state and ignore the motion detector for a period of time (1-60 minutes, for example). This prevents a single motion activity from causing an inordinate amount of triggering signals.

In one example, the controller goes into the activity counting mode automatically when the camera runs out of film. Thus, the camera can take 24 or 36 exposures for example, and when the film roll runs out, the activity counter continues to count the times the motion sensor is triggered. This allows a user to have a better idea of activity in the area even if the camera is out of film. In another example, controller 901 can include a date and time stamp chip and any triggering activities sensed by the camera can be saved in a memory (with or without taking a picture).

In one example, controller 901 is programmed to cause the camera to take a pre-determined number of exposures per triggering event. This places the controller into a burst state. For instance, a user may want to have a burst of pictures taken when motion is detected. In this case, when controller 901 receives a signal from motion detector 906, the controller causes a series of exposures to be taken one after another in rapid succession. In one embodiment, the controller can be programmed by a user to provide anywhere between 1 and 9 exposures per triggering event. The time between burst can be up to approximately 10 seconds, allowing time for the flash to recharge.

In one example, controller 901 is programmed so that controller can be put into a pause state. When put into a pause state, the controller ignores any triggering events of motion detector 906 until a pre-determined amount of time has elapsed. This allows a user to avoid wasting film when the motion detector is triggered by the same source very quickly. In one embodiment, the controller is programmable by a user so that the time of the pause between possible exposures is set optionally between 1 to 60 minutes. Other times the controller can be programmed to ignore a triggering activity, for example, during flash charging or when film is being removed.

In another example, controller 901 senses the power remaining in power supply 915 and when the power reaches a pre-determined low level, the controller activates first light 912 which acts as a low power indicator. This allows a user to predict if a camera 900 which is going to be unattended for a period of time will have enough power to function during the time period.

In another example, controller 901 activates second light 914 to perform testing functions. For instance, when controller 901 is put into a testing state by an actuating switch 917, the controller causes test light 914 to blink when the motion detector is triggered, but the controller does not cause the camera to expose any film. This allows a user to test the camera without wasting any film. Another example causes test light 914 to blink when the camera is turned on, allowing a user to know it is working. Actuating switch 917 can include a standby mode. In standby mode, a user can change the batteries of the camera without the camera auto-rewinding. Also, standby mode can be used to move the camera to another location without losing any information in the memory.

In another example, controller 901 sends a signal to camera mechanism 913 so that, at a user's option, an hour/minute stamp is placed on a picture, a year/date/month stamp is placed on the picture, or a time and date stamp is placed on a picture. This option allows a user the flexibility of choosing how to analyze the pictures taken.

Figure 14:
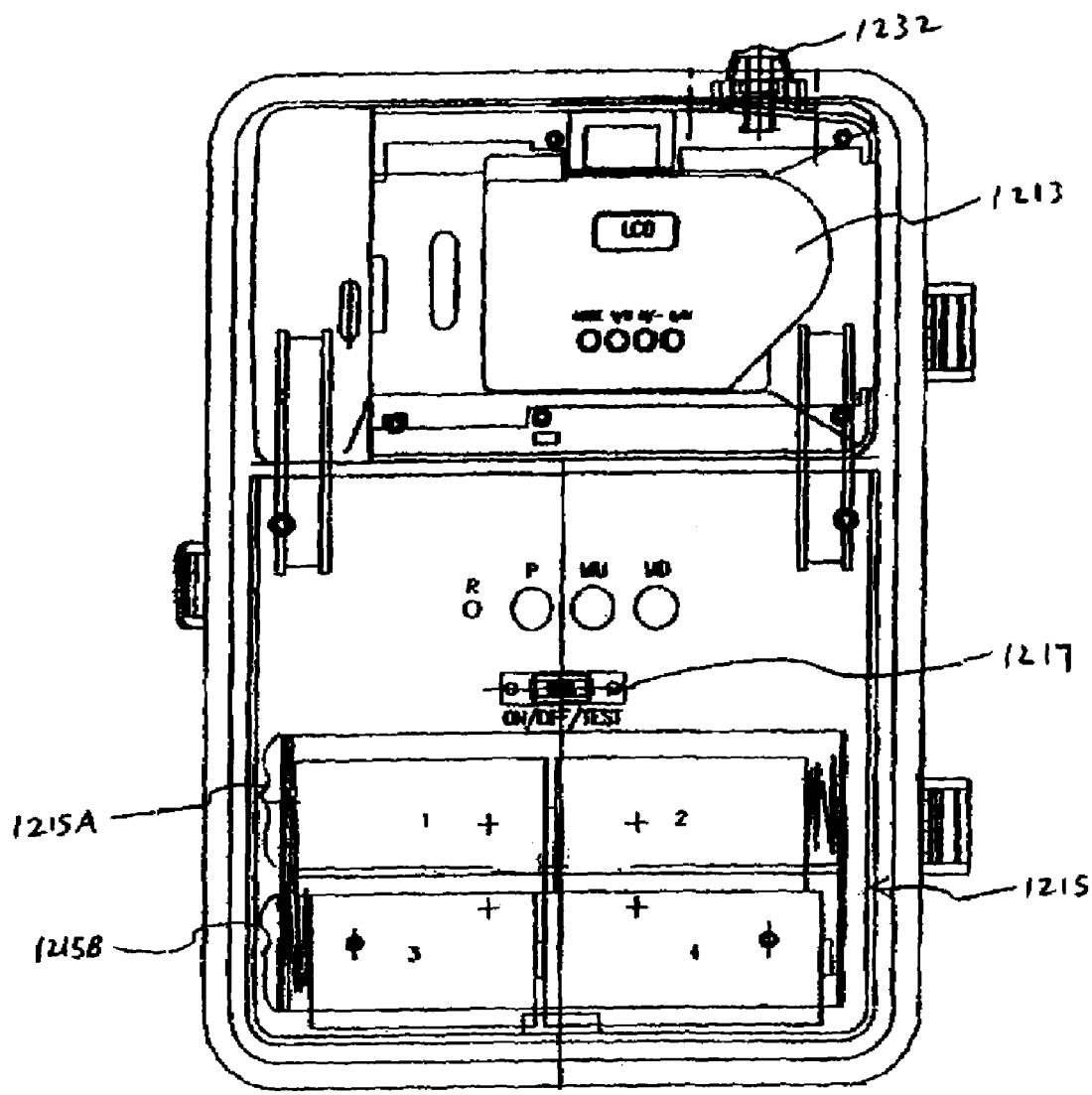
FIG. 14 shows a back view of the motion detector camera of FIG. 12.

FIGS. 12-14 show a front view, side view, and back view, respectively, of a motion detector camera 1200 according to one embodiment. Camera 1200 includes some features similar to the motion cameras discussed above and certain details will be omitted for sake of clarity. In general, camera 1200 includes a housing 1202, a lens 1204, a flash, 1208, and a motion detector 1206, such as an infra-red sensor to activate the camera by detecting heat and motion.

In this example, housing 1202 is a two-part enclosure for holding the various components of the camera. Housing 1202 can be a plastic, metal or composite material. In this example, housing 1202 includes a pair of hinges 1209 coupling the front and back shells of the housing 1202 together. A latch 1211 is provided for opening and closing the shells. Mounted within housing 1202 is a camera mechanism 1213. In one embodiment, camera mechanism 1213 includes film for the camera, such as a 35 mm film cartridge, an automatic film advance mechanism, and other conventional film camera components.

As discussed above, camera mechanism 1213 can include digital camera components including a light sensitive chip and one or more outputs, such as video-out ports or USB ports, for outputting the digital images to a TV, a computer, or a storage device. A digital camera can also include a permanent or removable flash-memory card to hold images. In one example, an 8 Mbyte flash memory is provided to hold up to 116 images. In one example, a viewfinder screen can be provided. The controller can be programmed to time and date stamp the digital images. Also, the controller can be programmed to store the time and date of a triggering activity in a memory, with or without taking a picture. This activity information can then be analyzed. In one example, a digital resolution of 640×480 is provided.

Also mounted within the housing is a power supply 1215 such as 4 C-size batteries. Other batteries (2 C-size batteries, AA batteries, D batteries, etc.) can also be used. In one example, power supply 1215 includes a solar power supply. In one embodiment, power supply 1215 is separated into a dual power supply. In a dual power supply, a first portion of power supply 1215, such as one or more batteries 1215A, are used to power flash 1208 and camera mechanism 1213, while a second portion of power supply 1215, such as one or more batteries 1215B, are used to power IR sensor 1206. By separately powering the motion detector and the camera/flash components, the present system helps avoids the motion detector or the flash from draining off too much power. Moreover, it allows the flash to be quickly recharged.

On a bottom surface of housing 1202 is a mounting section 1216, such as a threaded hole or separate nut, for mounting housing 1202 to a standard camera tripod or other standard-sized camera mounting member. Other mounting and securing means discussed above can be incorporated into camera 1200, such as strap holder 1280. Exposed on a front surface of housing 1202 are a low battery light 1212 and a test light 1214 which are similar to lights 112 and 114 discussed above for camera 100.

In one embodiment, motion detector 106 is an infrared motion sensor to detect heat and motion. In one example, motion detector 106 is a sensor which detects motion up to 50 feet away from the housing. Other embodiments provide sensing up to 23 feet away. Again, an actuating member can be provided to allow a user to control the effective distance of the sensor. The motion sensor can have a vertical coverage range of approximately 60 degrees and a horizontal coverage range of approximately 45 degrees. In some embodiments, motion detector 1206 can be a light sensor, an RF sensor, an active IR sensor, or other equivalent motion sensor.

In this example, flash 1208 is effective up to approximately 10 feet when the camera is used with ISO 200 film. With ISO 400 film it is effective up to approximately 14 feet, and with ISO 800 film it is effective to approximately 21 feet. As discussed above for camera 100, although flash 1208 is contained within the same housing 1202 as the rest of the camera mechanism, flash 1208 is separate from lens 1204 and the other mechanism 1213 of the camera. In other words, flash 1208 and the other camera components are not an integral unit such as in a conventional 35 mm flash camera. Again, this separate, yet all-in-one, structure of motion detector camera 1200 allows flash 1208 to be larger than in conventional 35 mm cameras while still providing the portable structure provided by including all the necessary picture taking components within a single housing 1202. Also, as discussed above, a light sensor 1205 can be incorporated into the camera to only activate the flash when it is necessary.

Camera 1200 includes a display 1257, such as an LCD display for displaying the number of exposures taken by the camera. Display 1257 can also be used to display other information, such as power level and so forth. In one embodiment, display 1257 can also be used as an activity counter, similar to the display 957 discussed above for camera 900.

FIG. 13 shows motion detector 1206 and the other components of camera 1200 coupled to one or more printed circuit boards 1275. One or more processors, memory chips, circuitry and/or software for controlling the functions of motion detector camera 1200 can be mounted to PCBs 1275 to constitute a controller 1201 for camera 1200. Here, the controller is shown schematically as controller 1201.

Controller 1201 is programmable similar to the controllers discussed above, and the above descriptions are incorporated herein by reference. In addition, camera 1200 includes a viewfinder 1234. Viewfinder 1234 is a flip-up viewer hingedly coupled to a top surface of housing 1202. A shutter button 1232 is also located on an external surface of the housing, in this example, on the top surface. External shutter button 1232 allows camera mechanism 1213 to be activated manually by a user. Viewfinder 1234 allows a user to frame the picture. Thus, camera 1200 allows a user to use the camera as a stand-alone manually operated camera or mounted to a stand using tripod-type mount 1216 or strap mount 1280 and used as a motion detector camera. In one example, camera 1200 is a relatively small camera having dimensions of approximately 14.5 cm×20.0 cm×6.5 cm.

Figure 15:
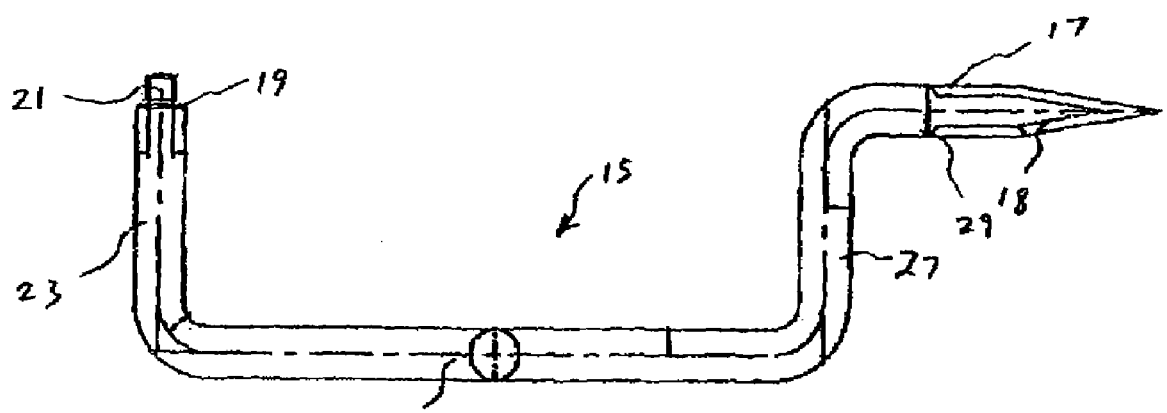
FIG. 15 shows a side view of a tree-mountable camera support according to one embodiment.

FIG. 15 shows a side view of a tree-mountable camera support 15 for mounting one or more camera discussed above to a tree or other similar structure. Support 15 includes a first end 17 having a mounting section 18 for mounting the support to a tree. In one example, mounting section 18 includes a threaded wood-screw structure. This allows support 15 to be mounted to a tree by screwing mounting section 18 into the tree. A second end 19 of support 15 includes a camera mounting portion 21. Mounting portion 21 includes a threaded post or bolt for mounting a camera to the support. The mounting portion can include a tripod-standard ¼"-20 threads/inch post. Posts having other sizes (⅜" or ½", for example) can also be used in some embodiments. Camera mounting portion 21 is oriented perpendicular to mounting section 18, allowing mounting section 18 to be mounted to a tree and camera mounting portion 21 to be ready to mount a camera to in a upright orientation.

In one example, support 15 includes a bent structure including four sections 23, 25, 27, and 29. Section 25 extends perpendicularly from an end of section 23. Section 27 extends perpendicularly from an end of section 25 and parallel to section 23. Sections 23, 25, and 27 define a U-shaped structure. Section 29 extends perpendicularly from an end of section 27 and is parallel to section 25. This bent structure gives support 15 a sturdier structure for supporting a camera.

Figure 16:
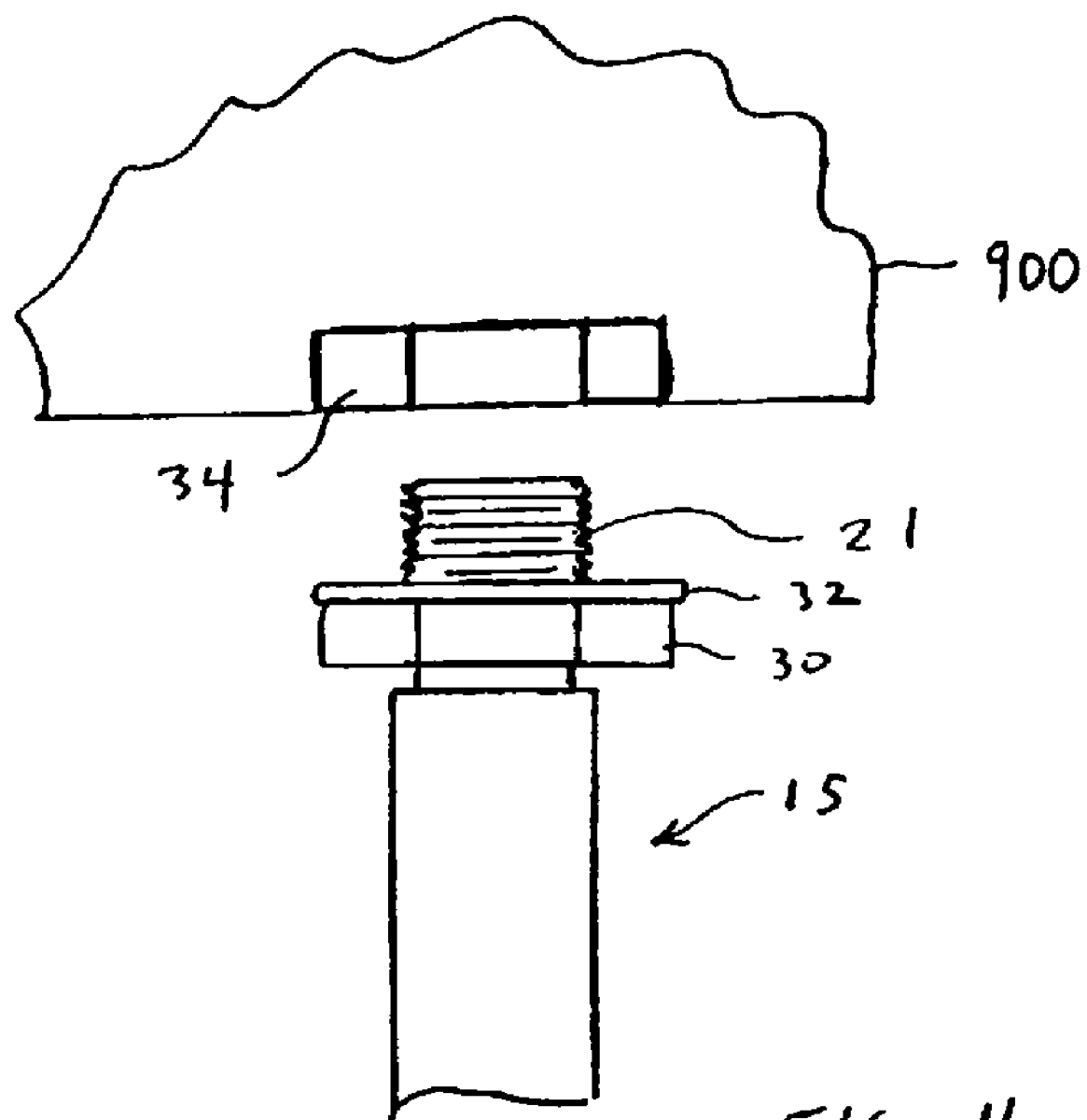
FIG. 16 shows a side view of further details of the camera support of FIG. 15.

FIG. 16 shows a side view of further details of camera support 15. In this example of using support 15, the support includes a nut 30 and a washer 32 mounted on mounting portion 21. A corresponding portion of camera 900 (or any of the camera discussed above) includes a threaded area 34 which is threaded to mate with mounting portion 21. Threaded area 34 can be a separate nut mounted to the camera or can be an integrally threaded portion of the camera. These members act as a locking mechanism to tightly hold the camera to mounting member 15. In use, threaded area 34 is screwed down upon mounting portion 21 until the bottom of the camera is approximately flush against the top surface of washer 32. Then nut 30 is tightened up against the camera to tightly hold the camera in place. To turn the camera to a different position, nut 30 is loosened, the camera is turned, and nut 30 is tightened again.

In one example use of one or more of the motion camera embodiments described above, the camera system is used for surveillance of game trials in a forest. For example, one or more of the cameras described above can be placed near a trail a user suspects may be frequented by an animal such as deer. The cameras can be mounted to a tree using flexible bands such as bands 150 or 730, tree support 15, or other means. A lock can be incorporated into the band to provide security.

The controllers of the cameras can be set by a user to provide one or more of the features described above. For instance, a controller can be optionally set to provide bursts of pictures when an animal triggers the motion detector. Also, the controller can be optionally set to go into pause state after each triggering event. This can be useful when a single animal is within the range of the motion detector for a long period of time. The controller can also be optionally set so that the camera can alternatively place an hour/minute stamp on a picture, a year/date/month stamp on a picture, or a time and date stamp on the picture. This is useful for a hunter to analyze the movement habits of the wildlife. One example allows a user to manually activate the camera if necessary. One embodiment provides an activity counter which can continue to count triggering activities even if the camera is out of film. One embodiment provides a dual-power system providing for longer battery life. One example saves the time and date stamp or other information of a triggering activity in a memory located in the camera.

Another example of a use of the system is as a security camera system. One or more of the cameras can be mounted to a house or in the area around a house or store. Again, the hour/minute stamp on a picture or a year/date/month stamp can be utilized, as well as the other features described above.

The above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A motion detector camera comprising:
a camera mechanism located inside a housing;
a motion detector exposed on a surface of the housing;
a controller to receive triggering signals from the motion detector, wherein when the controller receives a triggering signal from the motion detector, the controller activates the camera mechanism, and wherein the controller further includes a test mode, wherein when put into the test mode the controller activates a test indicator and does not activate the camera mechanism when a triggering signal is received; and
a shutter button mounted to the housing for manual activation of the camera mechanism.

2. The motion detector camera of claim 1, wherein the controller includes an operating mode in which the controller causes the camera mechanism to take two or more pictures in response to a single triggering signal.

3. The motion detector of claim 1, wherein the camera mechanism includes digital camera electronics.

4. The motion detector camera of claim 1, including a flash exposed on a surface of the housing and having a range of at least 23 feet.

5. The motion detector camera of claim 1, wherein the controller includes a pause state, wherein when put into the pause state, the controller does not activate the camera mechanism after receiving a triggering event signal from the motion detector.

6. A motion detector camera comprising:
a housing;
a camera mechanism mounted within the housing;
a motion detector exposed on a surface of the housing;

a controller operatively coupled to the camera mechanism and the motion detector, wherein the controller is adapted to send an activation signal to the camera mechanism when the controller receives a triggering signal from the motion detector;

a memory connected to the controller, wherein the controller includes at least two operating modes, wherein in a first mode the controller activates the camera mechanism when the controller receives a triggering signal from the motion detector, and wherein in a second mode the controller stores the triggering signal in the memory and does not activate the camera mechanism when the controller receives the triggering signal from the motion detector; and a shutter button mounted to the housing for manual activation of the camera mechanism.

7. The motion detector camera of claim 6, wherein the controller can be programmed to time and date stamp each of the triggering signals in the memory.

8. The motion detector camera of claim 7, wherein a user can retrieve the time and date of each of the triggering signals from the memory.

9. The motion detector camera of claim 6, wherein the controller includes an operating mode in which the controller causes the camera mechanism to take two or more pictures in response to a single triggering signal.

10. A motion detector camera comprising:

a housing;

a camera mechanism mounted within the housing;

a motion detector exposed on a surface of the housing;

a controller operatively coupled to the camera mechanism and the motion detector, wherein the controller is adapted to send an activation signal to the camera mechanism when the controller receives a triggering signal from the motion detector;

a memory connected to the controller; and a shutter button for manual activation of the camera mechanism, wherein the controller includes a test mode wherein the controller activates a test indicator and does not activate the camera mechanism when a triggering signal is received from the motion detector.

11. The motion detector camera of claim 10, wherein the camera mechanism does not include a separate, stand-alone camera.

12. The motion detector camera of claim 10, further including a display mounted on a front outer surface of the housing.

13. The motion detector camera of claim 10, further including a display mounted on a front outer surface of the housing.

* * * * *